United States Patent
Zhan et al.

(10) Patent No.: US 12,405,494 B2
(45) Date of Patent: Sep. 2, 2025

(54) DISPLAY WITH OFF-STATE TRANSPARENCY

(71) Applicant: Apple Inc., Cupertino, CA (US)

(72) Inventors: Tao Zhan, Saratoga, CA (US); Joshua A Spechler, Campbell, CA (US); Jun Qi, San Jose, CA (US); Ling Han, Santa Clara, CA (US); Rong Liu, Sunnyvale, CA (US); Victor H Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 18/328,262

(22) Filed: Jun. 2, 2023

(65) Prior Publication Data
US 2024/0045259 A1 Feb. 8, 2024

Related U.S. Application Data

(60) Provisional application No. 63/394,555, filed on Aug. 2, 2022.

(51) Int. Cl.
*G02F 1/1335* (2006.01)
*G02F 1/1334* (2006.01)
*G02F 1/137* (2006.01)

(52) U.S. Cl.
CPC ...... *G02F 1/133504* (2013.01); *G02F 1/1334* (2013.01); *G02F 1/133512* (2013.01);
(Continued)

(58) Field of Classification Search
CPC ........... G02F 1/133504; G02F 1/13775; G02F 1/1334; G02F 1/133512; G02F 1/133553; G02F 1/13718; G02F 2203/12
See application file for complete search history.

(56) References Cited

U.S. PATENT DOCUMENTS 7,230,766 B2 6/2007 Rogers
7,542,209 B2 6/2009 McGuire, Jr.
(Continued)

OTHER PUBLICATIONS

Shahram Izadi et al., Going Beyond the Display: A Surface Technology with an Electronically Switchable Diffuser, Proceedings of the 21st Annual ACM Symposium on User Interface Software and Technology, Monterey, CA, Oct. 2008, pp. 269-278, Association for Computing Machinery, New York, NY, United States.

*Primary Examiner* — Michael H Caley
*Assistant Examiner* — David Y Chung
(74) *Attorney, Agent, or Firm* — Treyz Law Group, P.C.; Joseph F. Guihan; Jinie M. Guihan (57) ABSTRACT

An electronic device may include a projection display that has a high transparency when the display is turned off. The high off-state transparency may create the appearance of the display being invisible in the off-state, which may be desirable in certain electronic devices. The projection display may include an adjustable diffuser, a spatial light modulator that projects images onto the adjustable diffuser, a mirror that reflects the images from the spatial light modulator to the adjustable diffuser, and a light source that provides light to the spatial light modulator. The projection display may also include an adjustable opacity layer that is controlled based on detected ambient light levels. The projection display may also include an adjustable reflectivity layer. The adjustable diffuser and/or light source may be pixelated to increase contrast in the projection display.

20 Claims, 11 Drawing Sheets

(52) U.S. Cl.
CPC .... *G02F 1/133553* (2013.01); *G02F 1/13718* (2013.01); *G02F 1/13775* (2021.01); *G02F 2203/12* (2013.01)

(56) References Cited

U.S. PATENT DOCUMENTS

| | | | |
|---|---|---|---|
| 8,654,234 | B2 | 2/2014 | Hirsch et al. |
| 8,964,298 | B2 | 2/2015 | Haddick et al. |
| 10,649,208 | B2 | 5/2020 | Li |
| 11,388,329 | B1* | 7/2022 | Qiao ........................ G02B 6/08 |
| 2011/0317399 | A1* | 12/2011 | Hsu ........................ G02F 1/1323 |
| | | | 362/97.1 |
| 2012/0127127 | A1* | 5/2012 | Large ................... G06F 3/0425 |
| | | | 345/175 |
| 2012/0127320 | A1* | 5/2012 | Balogh ................ H04N 13/363 |
| | | | 353/121 |
| 2012/0133606 | A1 | 5/2012 | Artusi |
| 2017/0176652 | A1* | 6/2017 | Wheatley .......... G02F 1/133362 |
| 2019/0064738 | A1* | 2/2019 | Cole ........................ G03H 1/26 |
| 2019/0258116 | A1* | 8/2019 | Demir ............... G02F 1/133514 |
| 2019/0297177 | A1* | 9/2019 | Wilson .................... G02F 1/172 |
| 2020/0207188 | A1* | 7/2020 | Jones ........................ B60J 3/04 |
| 2021/0208391 | A1* | 7/2021 | Fan-Chiang ....... G03B 21/2073 |
| 2022/0043394 | A1* | 2/2022 | Smeeton ................. G03H 1/02 |

* cited by examiner

DISPLAY WITH OFF-STATE TRANSPARENCY

This application claims priority to U.S. provisional patent application No. 63/394,555, filed Aug. 2, 2022, which is hereby incorporated by reference herein in its entirety.

BACKGROUND

This relates generally to electronic devices, and, more particularly, to electronic devices with displays.

Electronic devices often include displays. For example, an electronic device may have an organic light-emitting diode (OLED) display based on organic light-emitting diode pixels or a liquid crystal display (LCD) with liquid crystal display pixels. Displays may not have a desired appearance when the displays are turned off.

SUMMARY

An electronic device may include an adjustable diffuser that is operable in a first state with a first haze and a second state with a second haze that is greater than the first haze, a light source, and a spatial light modulator configured to receive light from the light source and project the light onto the adjustable diffuser while the adjustable diffuser is in the second state.

An electronic device may include a housing and a projection display that is configured to display images and that is coupled to the housing. The projection display may include an adjustable diffuser operable in a first mode and a second mode in which diffusion is higher than the first mode and a spatial light modulator configured to project light for the images onto the adjustable diffuser while the adjustable diffuser is in the second mode. The adjustable diffuser may be configured to operate in the first mode when the projection display is off.

An electronic device may include a housing, an adjustable diffuser that is coupled to the housing, and a spatial light modulator that is coupled to the housing and that is configured to project light onto the adjustable diffuser. The adjustable diffuser may have first and second opposing edges connected by third and fourth opposing edges. The housing may extend along the first edge of the adjustable diffuser without completely surrounding the adjustable diffuser.

DETAILED DESCRIPTION

Figure 1:
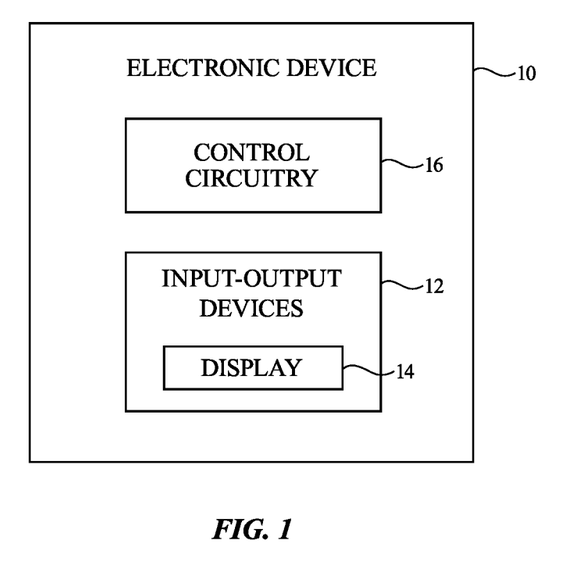
FIG. 1 is a schematic diagram of an illustrative electronic device having a display in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, a standalone device such as a digital picture frame display, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include control circuitry 16 for supporting the operation of device 10. The control circuitry may include storage such as hard disk drive storage, nonvolatile memory (e.g., flash memory or other electrically-programmable-read-only memory configured to form a solid state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a liquid crystal display, an organic light-emitting diode display, a projection display that includes an illumination engine (including one or more light-emitting diodes) and a spatial light modulator, or any other desired type of display. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

In one possible arrangement, display 14 may be a projection display that has a high transparency when the display is turned off. The high off-state transparency may create the appearance of the display being invisible in the off-state, which may be desirable in certain electronic devices.

Figure 2A:
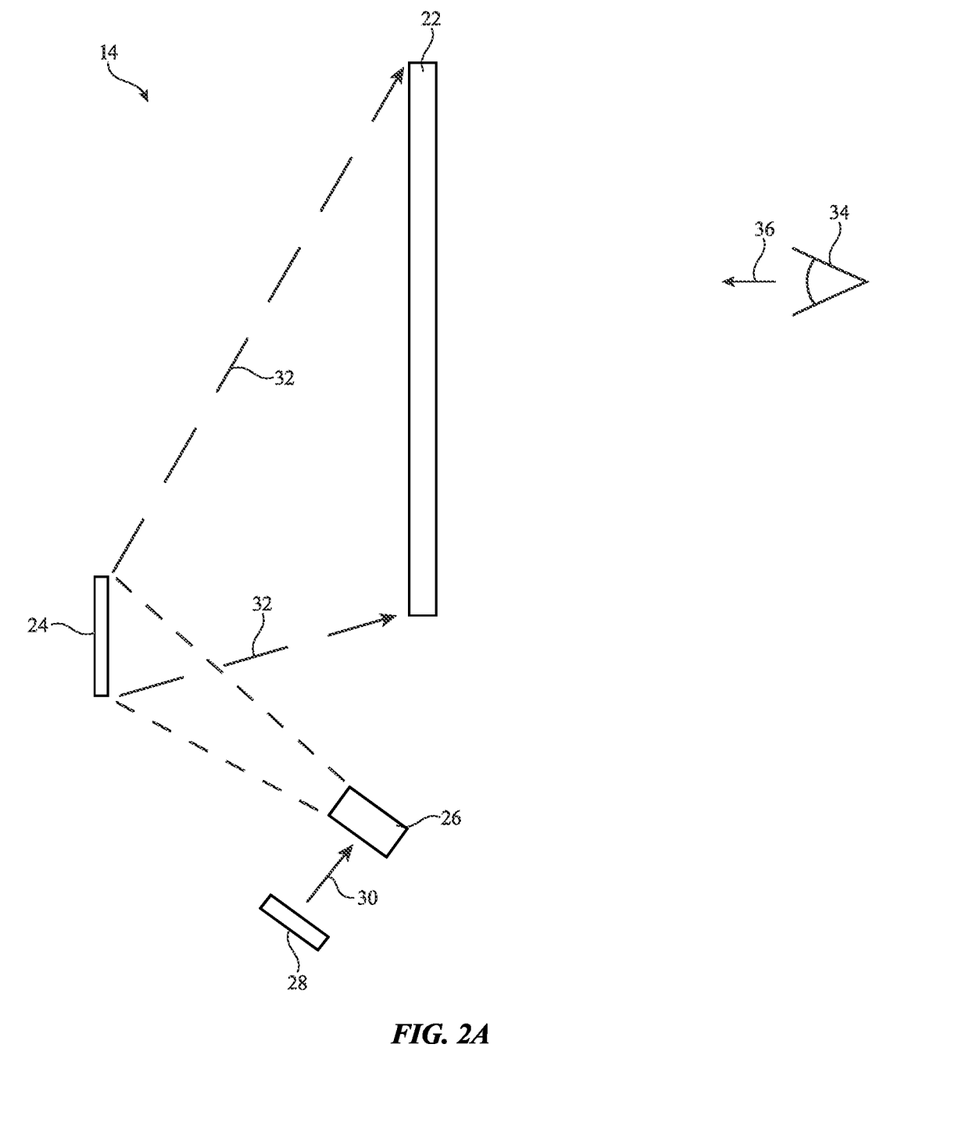
FIG. 2A is a side view of a rear-projection display with a spatial light modulator and an adjustable diffuser in accordance with some embodiments.

A schematic diagram for an illustrative projection display is shown in FIG. 2A. As shown, display 14 may include a switchable diffuser 22, a mirror 24, a spatial light modulator 26, and an illumination engine 28. Illumination engine 28 (sometimes referred to as light source 28) may generate illumination light 30. One or more light sources may be formed in the illumination engine and may produce the illumination light 30. For example, illumination engine 28 may include one or more red light-emitting diodes (that are controlled in unison), one or more green light-emitting diodes (that are controlled in unison), one or more blue light-emitting diodes (that are controlled in unison), etc. The illumination engine may include an optical component (e.g., a prism) that merges light of different colors into illumination light 30.

Spatial light modulator 26 may spatially modulate the light from illumination engine 28 to produce image light 32. In other words, the spatial light modulator may receive a beam of light and modulate the beam to form a desired target image. Spatial light modulator 26 may be a transmissive or reflective spatial light modulator. Spatial light modulator 26 may be an electrically-addressed spatial light modulator (EASLM) such as a digital micromirror device (DMD) used in a digital light processing (DLP) projector or a liquid crystal on silicon (LCOS) display. Spatial light modulator 26 may be an optically-addressed spatial light modulator (OASLM). In general, the spatial light modulator may be any desired type of spatial light modulator.

Light 32 from the spatial light modulator is projected towards and reflected off mirror 24. Mirror may have a reflectivity of greater than 80%, greater than 90%, greater than 95%, greater than 99%, etc. Mirror 24 reflects light from spatial light modulator 26 towards switchable diffuser 22.

When display 14 is off (e.g., not used to display images), the switchable diffuser 22 may be placed in a first mode in which diffusion is low. In this state, the switchable diffuser has a high transparency.

When display 14 is on (e.g., used to display images), the switchable diffuser may be placed in a second mode in which diffusion is high. In this state, the switchable diffuser diffuses the display light 32 from mirror 24 and spatial light modulator 26 to cause the display light to be visible to a viewer 34 viewing the display in direction 36.

Switchable diffuser 22 (sometimes referred to as adjustable diffuser 22) may have a minimum haze in the first mode (when diffusion is low) and a maximum haze in the second mode (when diffusion is high). Haze may be measured as the percentage of incident light scattered by more than 2.5 degrees through the adjustable diffuser. The minimum haze of adjustable diffuser 22 (i.e., the haze in the first mode) may be less than 20%, less than 10%, less than 5%, less than 3%, less than 1%, etc. The maximum haze of diffuser layer 22 (i.e., the haze in the second mode) may be greater than 20%, greater than 30%, greater than 40%, greater than 50%, greater than 60%, etc. The ratio of the maximum haze to the minimum haze of adjustable diffuser 70 may be greater than 2, greater than 3, greater than 5, greater than 10, greater than 20, greater than 40, greater than 60, etc. The adjustable diffuser may be set to have an intermediate haze between the minimum haze and the maximum haze if desired.

Adjustable diffuser 22 may be implemented using polymer dispersed liquid crystal (PDLC), polymer network liquid crystal (PNLC) material, polymer stabilized cholesteric texture (PSCT) material, smectic A (SmA) phase liquid crystal, a combination of these materials, and/or other suitable adjustable light diffusing materials.

Adjustable diffuser 22 may be considered to have a front side (that faces the viewer 34) and a back side (that faces away from the viewer). In FIG. 2A, image light from spatial light modulator 26 is projected onto the back side of adjustable diffuser 22. A projection display of this type may sometimes be referred to as a backside-projection display or a rear-projection display. This example is merely illustrative. In another possible arrangement, shown in FIG. 2B, image light from spatial light modulator 26 is projected onto the front side of adjustable diffuser 22. A projection display of this type may sometimes be referred to as a front-side-projection display or a front-projection display. The operation of display 14 (with illumination engine 28, spatial light modulator 26, mirror 24, and adjustable diffuser 22) is otherwise the same in FIG. 2B as in FIG. 2A.

Figure 3A:
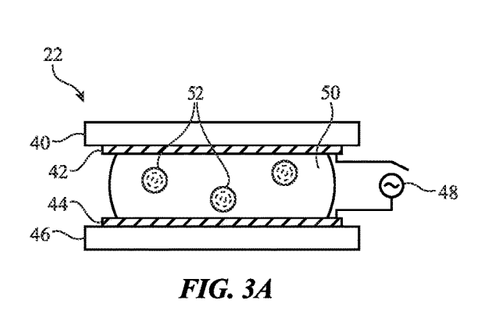
FIGS. 3A and 3B are side views of an adjustable diffuser formed from polymer dispersed liquid crystal (PDLC) in accordance with some embodiments.
Figure 3B:
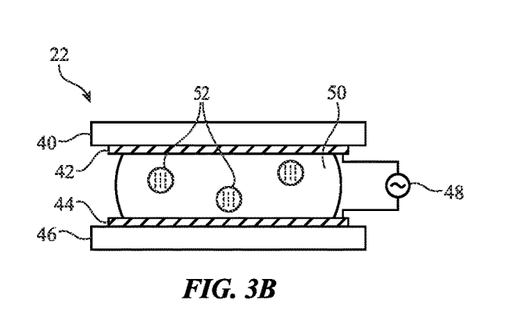

FIGS. 3A and 3B are cross-sectional side views of an illustrative switchable diffuser 22 formed from using polymer dispersed liquid crystal (PDLC). As shown in FIG. 3A, as one possible arrangement, liquid crystal droplets 52 may be dispersed in a host layer 50 (e.g., polymer) between transparent substrates 40 and 46. Substrates 40 and 46 may be formed from glass, plastic, or other transparent substrate material. Transparent conductive materials such as layers of indium tin oxide (ITO) 42 and 44 may be formed on each of substrates 40 and 46 to control the behavior of the liquid crystal droplets 52. Voltage source 48 may be used to apply some amount of voltage onto layers 42 and 44 to control the orientation of the liquid crystal material in droplets 52. For example, switchable diffuser 22 may be placed in a first state (as in FIG. 3A) when no voltage is applied and the liquid crystals have random orientation and are therefore diffusive. In FIG. 3A, switchable diffuser 22 may have a maximum haze. Switchable diffuser 22 may be placed in a second state (as in FIG. 3B) when a nominal voltage level is applied and the liquid crystals are aligned and therefore clear. In FIG. 3B, switchable diffuser 22 may have a minimum haze. If desired, an intermediate voltage level that is between zero volts and the nominal high voltage level may be applied to fine tune the optical behavior of adjustable diffuser 22.

Figure 4A:
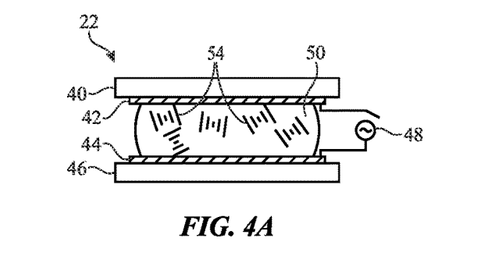
FIGS. 4A and 4B are side views of an adjustable diffuser that is formed from polymer stabilized cholesteric texture (PSCT) and that is more diffusive with no applied voltage in accordance with some embodiments.

FIGS. 4A and 4B are cross-sectional side views of an illustrative switchable diffuser 22 formed from using polymer stabilized cholesteric texture (PSCT) material. As shown in FIG. 4A, as one possible arrangement, liquid crystal molecules 54 may be dispersed in a host layer 50 (e.g., polymer) between transparent substrates 40 and 46 (with corresponding transparent conductive layers 42 and 44). Voltage source 48 may be used to apply some amount of voltage onto layers 42 and 44 to control the orientation of the liquid crystal molecules 54.

Figure 4B:
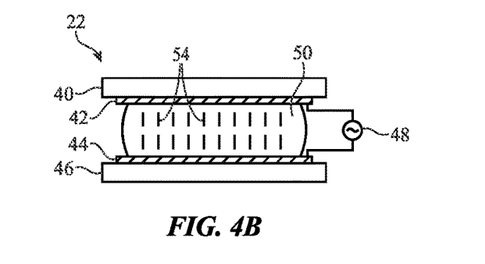

In FIGS. 4A and 4B, the PSCT-based switchable diffuser defaults to a mode with a maximum haze when no voltage is applied. Accordingly, switchable diffuser 22 may be placed in a first state (as in FIG. 4A) when no voltage is applied and the liquid crystals have random orientation and are therefore diffusive. In FIG. 4A, switchable diffuser 22 may have a maximum haze. Switchable diffuser 22 may be placed in a second state (as in FIG. 4B) when a nominal voltage level is applied and the liquid crystals are aligned and therefore clear. In FIG. 4B, switchable diffuser 22 may have a minimum haze. If desired, an intermediate voltage level that is between zero volts and the nominal high voltage level may be applied to fine tune the optical behavior of adjustable diffuser 22 in FIGS. 4A and 4B.

Figure 5A:
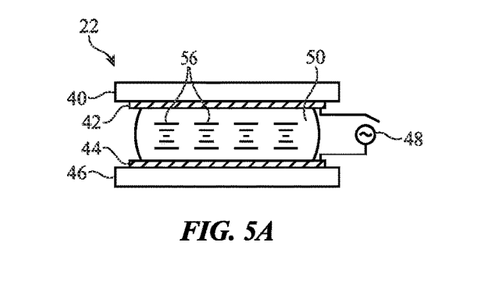
FIGS. 5A and 5B are side views of an adjustable diffuser that is formed from polymer stabilized cholesteric texture (PSCT) and that is less diffusive with no applied voltage in accordance with some embodiments.
Figure 5B:
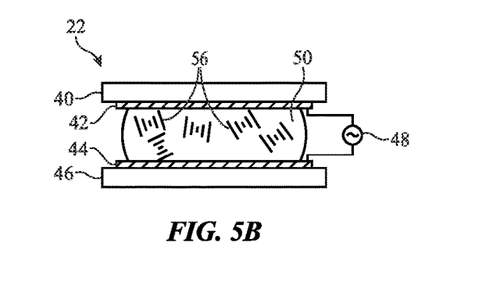

FIGS. 5A and 5B show a PSCT-based switchable diffuser with a similar arrangement as in FIGS. 4A and 4B except with liquid crystal molecules 56 that default to a mode with a minimum haze when no voltage is applied. Switchable diffuser 22 may be placed in a first state (as in FIG. 5A) when no voltage is applied and the liquid crystals are aligned and therefore clear. In FIG. 5A, switchable diffuser 22 may have a minimum haze. Switchable diffuser 22 may be placed in a second state (as in FIG. 5B) when a nominal voltage is applied and the liquid crystals have random orientation and are therefore diffusive. In FIG. 5B, switchable diffuser 22 may have a maximum haze. If desired, an intermediate voltage level that is between zero volts and the nominal high voltage level may be applied to fine tune the optical behavior of adjustable diffuser 22 in FIGS. 5A and 5B.

The PSCT-based switchable diffuser may have a reduced switching time and improved viewing angle relative to the PDLC-based switchable diffuser. The diffuser may be designed to default to the expected most-common mode when no voltage is applied. If the display is expected to normally be on, the switchable diffuser may default to the high diffusion mode with maximum haze when no voltage is applied (as in FIGS. 3A and 4A). If the display is expected to normally be off, the switchable diffuser may default to the low diffusion mode with minimum haze when no voltage is applied (as in FIG. 5A).

Figure 2B:
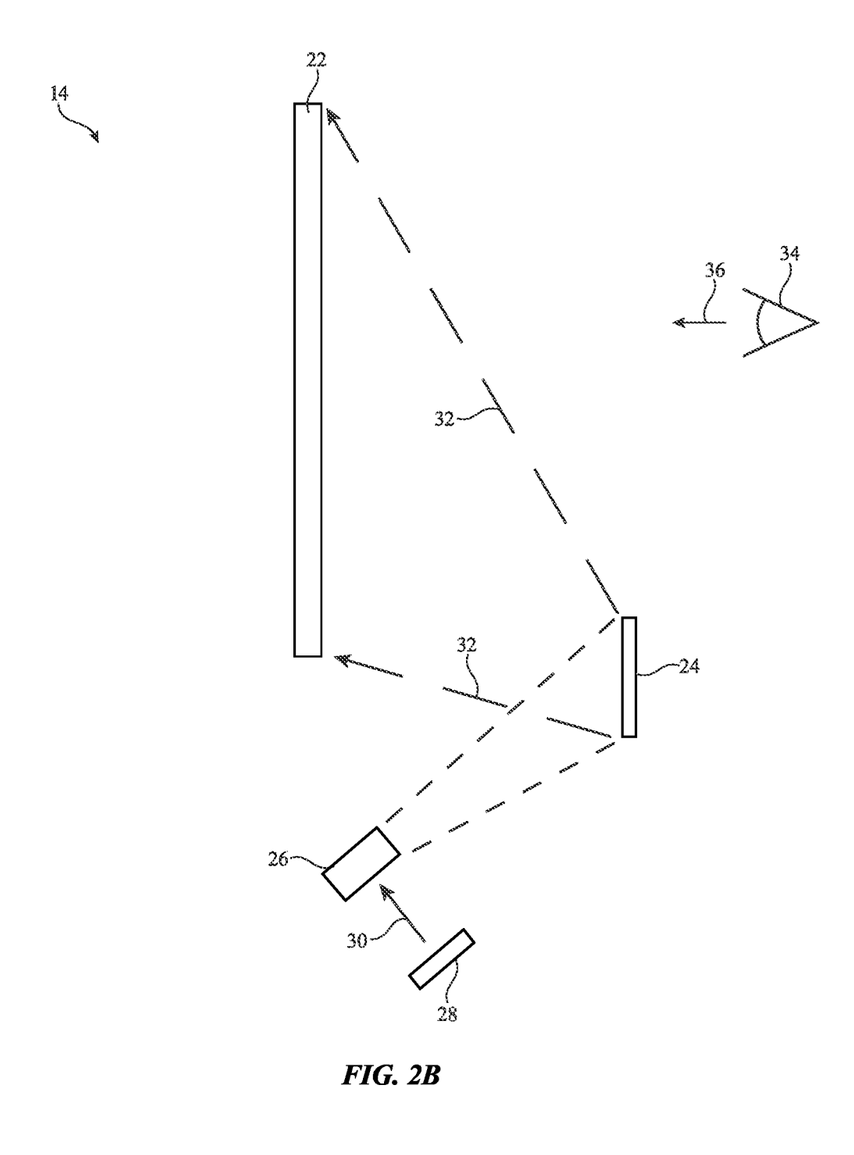
FIG. 2B is a side view of a front-projection display with a spatial light modulator and an adjustable diffuser in accordance with some embodiments.

In FIGS. 2A and 2B, adjustable diffuser 22 is controlled globally. In other words, the entire adjustable diffuser is placed in a first state with a minimum haze, the entire adjustable diffuser is placed in a second state with a maximum haze, or the entire adjustable diffuser is placed in a third state with an intermediate haze between the minimum haze and the maximum haze. In this type of example, the contrast ratio of display 14 is equal to the contrast ratio achievable using spatial light modulator 26 (e.g., $CR_{DISPLAY}=CR_{SLM}$, where $CR_{DISPLAY}$ is the contrast ratio of the display and $CR_{SLM}$ is the contrast ratio of the spatial light modulator). This example is merely illustrative.

Figure 6:
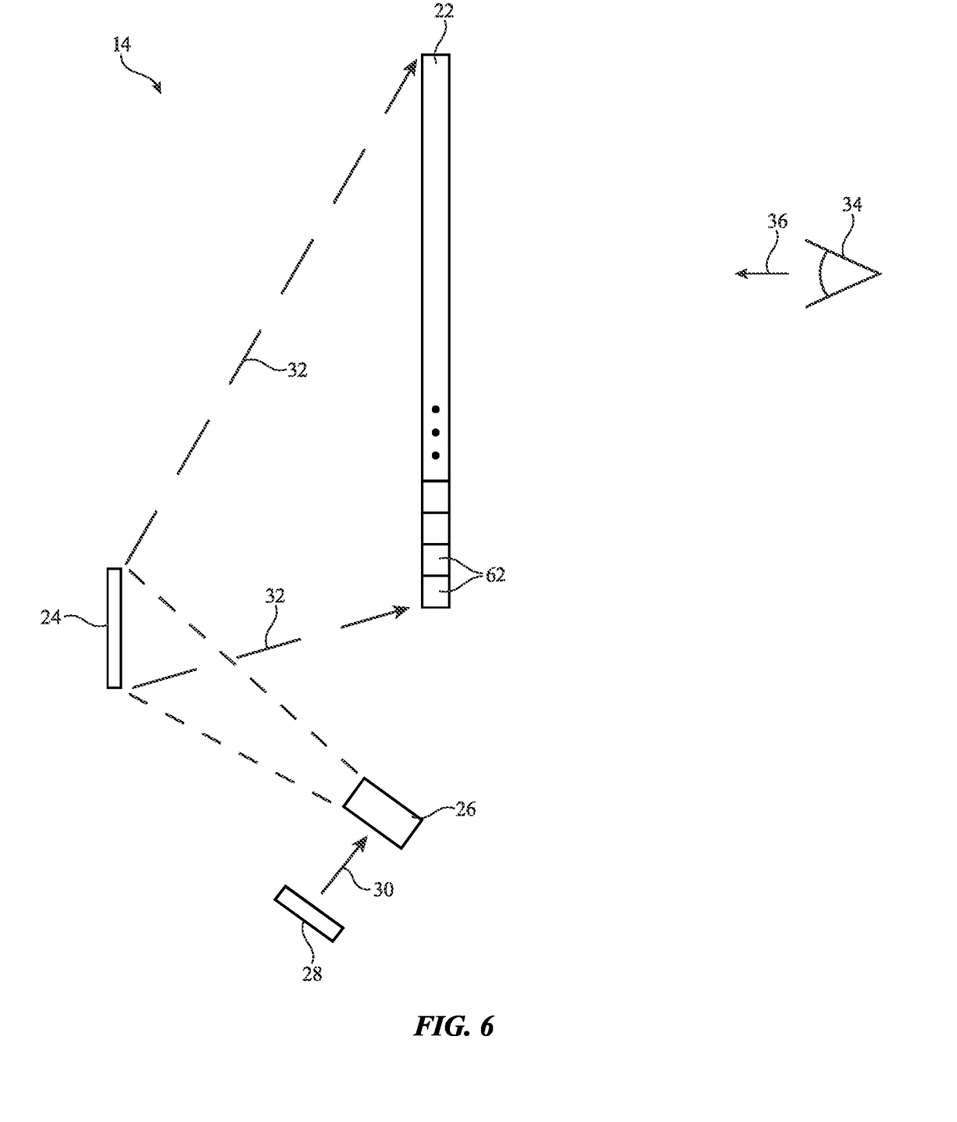
FIG. 6 is a side view of a projection display with a pixelated adjustable diffuser in accordance with some embodiments.

To improve the contrast ratio in display 14, adjustable diffuser 22 may include a plurality of independently addressable portions (sometimes referred to as pixels). FIG. 6 is a diagram of a display of this type. As shown, adjustable diffuser 22 includes a plurality of pixels 62. The switchable diffuser may include an array of pixels 62 arranged in rows and columns, as one example. Each pixel 62 within adjustable diffuser 22 may be individually adjusted between the possible states for the adjustable diffuser (e.g., a first state with a minimum haze, a second state with a maximum haze, or a third state with an intermediate haze).

There may be any desired number of pixels 62 in adjustable diffuser 22 (e.g., more than more than 50, more than 100, more than 300, more than 500, more than 1,000, more than more than 10,000, etc.). The number of pixels 62 in adjustable diffuser 22 may be, in some displays, equal to the number of pixels in spatial light modulator 26. In other words, each pixel in the displayed image (using light 32) has a corresponding pixel 62 in adjustable diffuser 22. Alternatively, the number of pixels 62 in adjustable diffuser 22 may be less than the number of pixels in spatial light modulator 26. In other words, multiple pixels in the displayed image (using light 32) have a corresponding pixel 62 in adjustable diffuser 22.

There may be any desired number of pixels 62 in adjustable diffuser 22 (e.g., more than 10, more than 50, more than 100, more than 300, more than 500, more than 1, 000, more than 5, 000, more than 10, 000, etc.). The number of pixels 62 in adjustable diffuser 22 may be, in some displays, equal to the number of pixels in spatial light modulator 26. In other words, each pixel in the displayed image (using light 32) has a corresponding pixel 62 in adjustable diffuser 22. Alternatively, the number of pixels 62 in adjustable diffuser 22 may be less than the number of pixels in spatial light modulator 26. In other words, multiple pixels in the displayed image (using light 32) have a corresponding pixel 62 in adjustable diffuser 22.

Having a pixelated adjustable diffuser may improve the contrast ratio of display 14. In displays with a pixelated adjustable diffuser, the contrast ratio of display 14 may be equal to the contrast ratio of the spatial light modulator 26 multiplied by the contrast ratio of the pixelated adjustable diffuser (e.g., $CR_{DISPLAY}=CR_{SLM} \times CR_{AD}$, where $CR_{AD}$ is the contrast ratio of the adjustable diffuser).

In FIG. 2A, FIG. 2B, and FIG. 6, illumination engine 28 provides uniform input light 30 to spatial light modulator 26. To provide the uniform input light, the illumination engine may include only one light-emitting diode for a given or may include multiple light-emitting diodes that are controlled in unison for a given color. Additional contrast ratio improvements may be achieved in display 14 by providing pixelated light with illumination engine 28.

Figure 7:
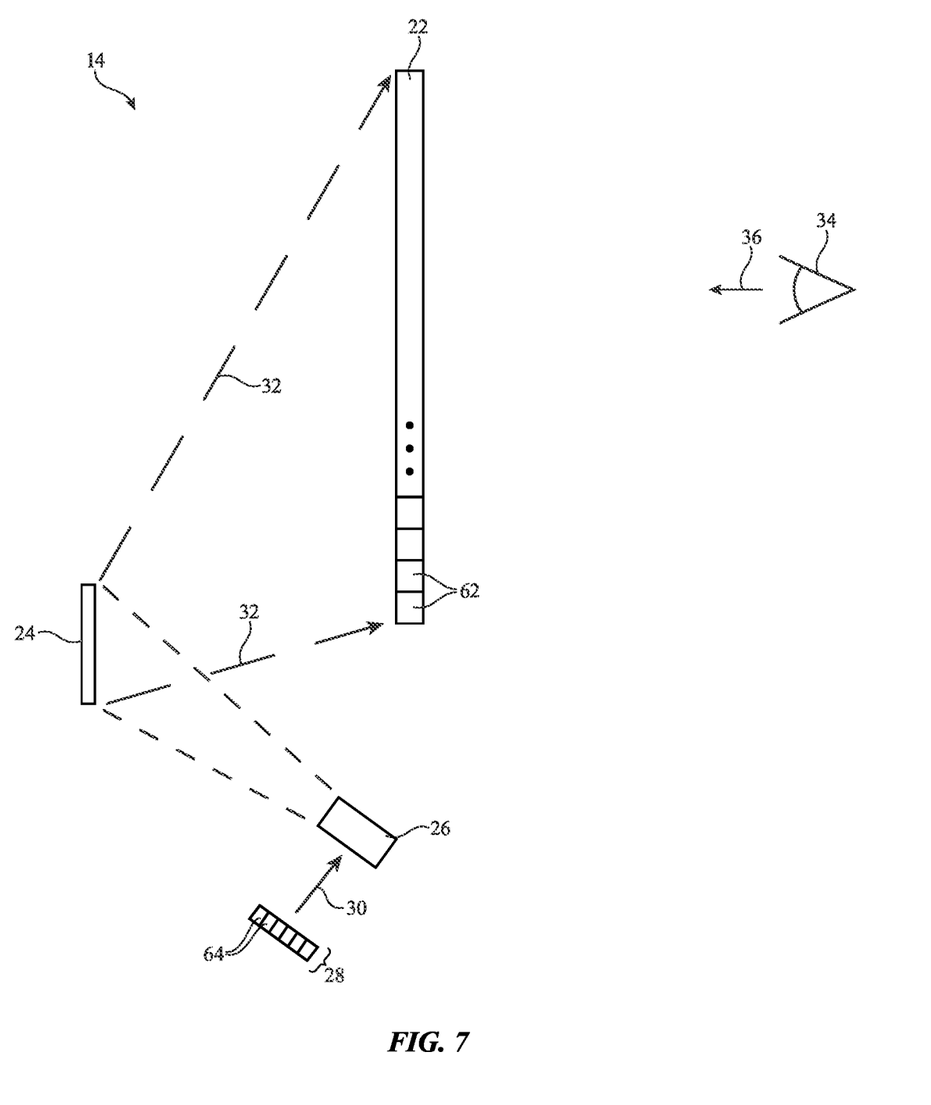
FIG. 7 is a side view of a projection display with a pixelated illumination engine in accordance with some embodiments.

As shown in FIG. 7, illumination engine 28 may include a plurality of pixels 64. For example, illumination engine 28 may include one or more red light-emitting diodes that are controlled individually, one or more green light-emitting diodes that are controlled individually, one or more blue light-emitting diodes that are controlled individually, etc. In one possible arrangement, illumination engine 28 includes an array of red light-emitting diodes that are controlled individually, an array of green light-emitting diodes that are controlled individually, and an array of blue light-emitting diodes that are controlled individually. Light from the three arrays of light-emitting diodes may be merged to form the light 30 provided to spatial light modulator 26.

Each array of individually controlled light-emitting diodes (e.g., pixels 64) in FIG. 7 may include any desired number of pixels (e.g., more than 10, more than 50, more than 100, more than 300, more than 500, more than 1,000, more than 5,000, more than 10,000, etc.). The number of pixels 64 may be, in some displays, equal to the number of pixels in spatial light modulator 26. In other words, each pixel in the displayed image (using light 32) has a corresponding pixel 64 in illumination engine 28. Alternatively, the number of pixels 64 in illumination engine 28 may be less than the number of pixels in spatial light modulator 26. In other words, multiple pixels in the displayed image (using light 32) have a corresponding pixel 64 in illumination engine 28.

Having a pixelated illumination engine may improve the contrast ratio of display 14. In displays with a pixelated adjustable diffuser and a pixelated illumination engine, the contrast ratio of display 14 may be equal to the contrast ratio of the spatial light modulator 26 multiplied by the contrast ratio of the pixelated adjustable diffuser multiplied by the contrast ratio of the illumination engine (e.g., $CR_{DISPLAY}=CR_{SLM} \times CR_{AD} \times CR_{IE}$, where $CR_{IE}$ is the contrast ratio of the illumination engine). A display may alternatively include a pixelated illumination without including a pixelated adjustable diffuser if desired (e.g., $CR_{DISPLAY}=CR_{SLM} \times CR_{IE}$).

FIG. 7 shows an example of a display with a pixelated illumination engine and a pixelated adjustable diffuser that receives projected light on its back side. In another possible arrangement, a pixelated illumination engine may be included in a display where image light from spatial light modulator 26 is projected onto the front side of a pixelated adjustable diffuser (e.g., the display may have the arrangement of FIG. 2B but with a pixelated adjustable diffuser and a pixelated illumination engine).

Figure 8:
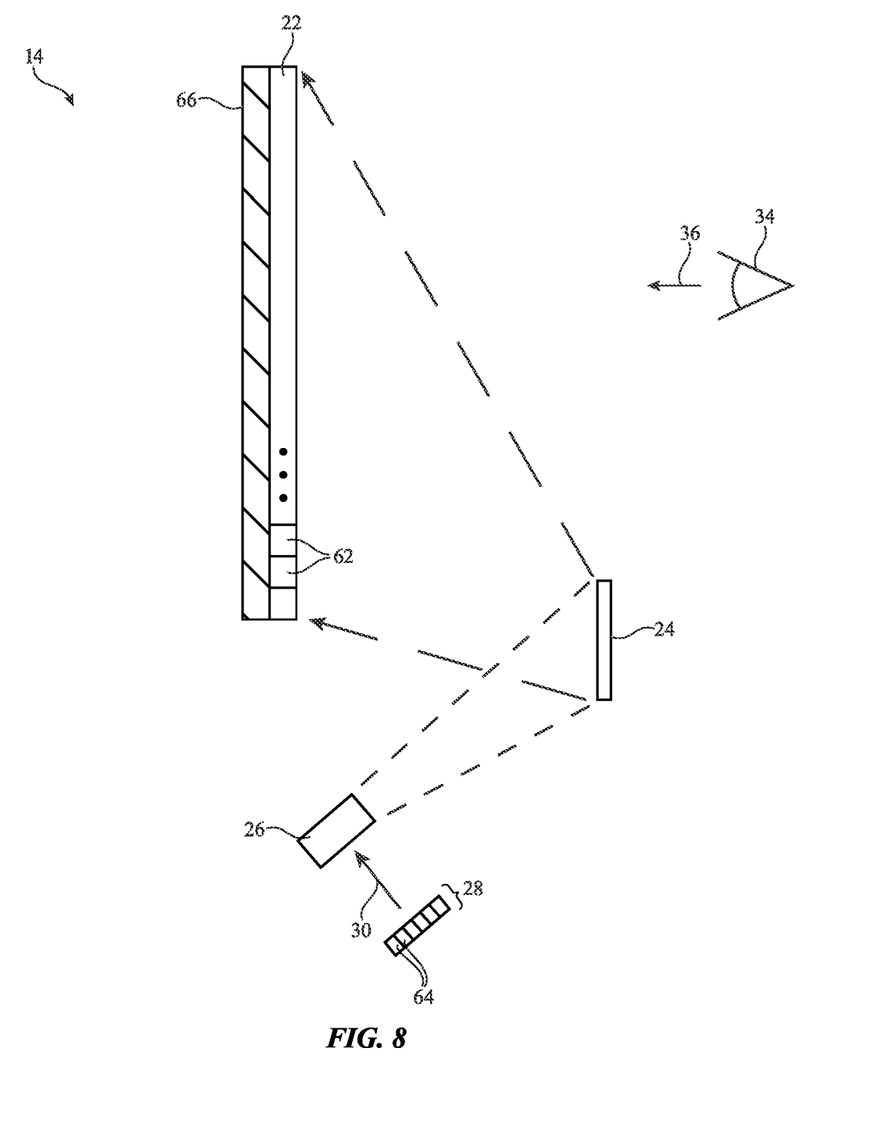
FIG. 8 is a side view of a projection display with an adjustable opacity layer in accordance with some embodiments.

FIG. 8 is a diagram of a front-projection display with an active absorber for additional improvements in contrast ratio. As shown in FIG. 8, display 14 includes a pixelated illumination engine 28, a spatial light modulator 26, a mirror 24, and a pixelated adjustable diffuser 22. Display 14 additionally includes an active absorber 66 on the rear-side of adjustable diffuser 22. Adjustable diffuser 22 is therefore interposed between viewer 34 and active absorber 66.

Active absorber 66 may be switchable between a first state having a maximum opacity (and minimum transparency) and a second state having a minimum opacity (and maximum transparency). The active absorber may optionally be placed in another state with an intermediate opacity between the maximum opacity and the minimum opacity.

Active absorber 66 (sometimes referred to as an adjustable opacity layer 66) may be formed using a suspended particle device (with particles suspended in an organic gel), an electrochromic (EC) layer, a liquid crystal shutter, electronic ink (E ink), or any other desired components.

The minimum opacity of adjustable opacity layer 66 may be less than 20%, less than 10%, less than 5%, less than 3%, less than 1%, etc. The maximum opacity of adjustable opacity layer 66 may be greater than 20%, greater than 30%, greater than 40%, greater than 50%, greater than 60%, greater than 70%, greater than 80%, greater than 90%, greater than 95%, etc. The ratio of the maximum opacity to the minimum opacity of adjustable opacity layer 66 may be greater than 2, greater than 3, greater than 5, greater than 10, greater than 20, greater than 40, greater than 60, greater than 75, greater than 90, etc. In some cases, the adjustable opacity layer may be a bistable adjustable opacity layer that is operable in either a first state with the maximum opacity or a second state with the minimum opacity. In some cases, the adjustable opacity layer may be set to have an intermediate opacity between the minimum opacity and the maximum opacity if desired.

Adjustable opacity layer 66 may block ambient light from passing through the rear of the adjustable diffuser. This improves the contrast ratio of the display, particularly in bright ambient light conditions. The adjustable opacity layer 66 may be controlled based on an ambient light level detected within the scene. For example, an ambient light sensor in electronic device 10 (e.g., one of input-output devices 12 in FIG. 1) may detect the ambient light level in real time. The ambient light level may be compared to one or more thresholds. As an example, the adjustable opacity layer 66 may be controlled to have a maximum opacity if the detected ambient light level is greater than a given threshold and the adjustable opacity layer 66 may be controlled to have a minimum opacity if the detected ambient light level is less than the given threshold. Additional thresholds may be used to control the adjustable opacity layer to have one or more intermediate opacity levels between the maximum opacity level and the minimum opacity level.

Figure 9:
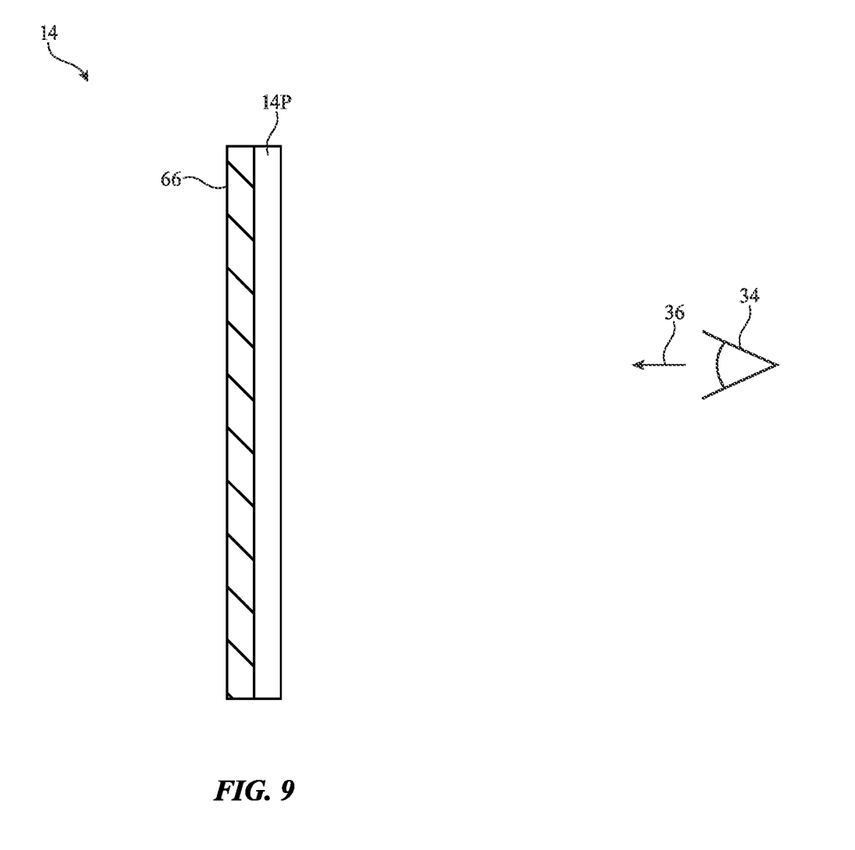
FIG. 9 is a side view of a transparent display with an adjustable opacity layer in accordance with some embodiments.

The example in FIG. 8 of adjustable opacity layer 66 being formed behind the adjustable diffuser in a front-projection display is merely illustrative. In general, an adjustable opacity layer 66 may be formed behind any type of transparent display panel. FIG. 9 shows an example of a display with adjustable opacity layer 66 formed behind transparent display panel 14P. The transparent display panel may be any desired type of transparent display panel (e.g., a transparent organic light-emitting diode display panel).

Adjustable opacity layer 66 in FIGS. 8 and 9 may optionally be pixelated if desired. Each individually addressable portion (pixel) in adjustable opacity layer 66 may have an individually controlled opacity.

Figure 10:
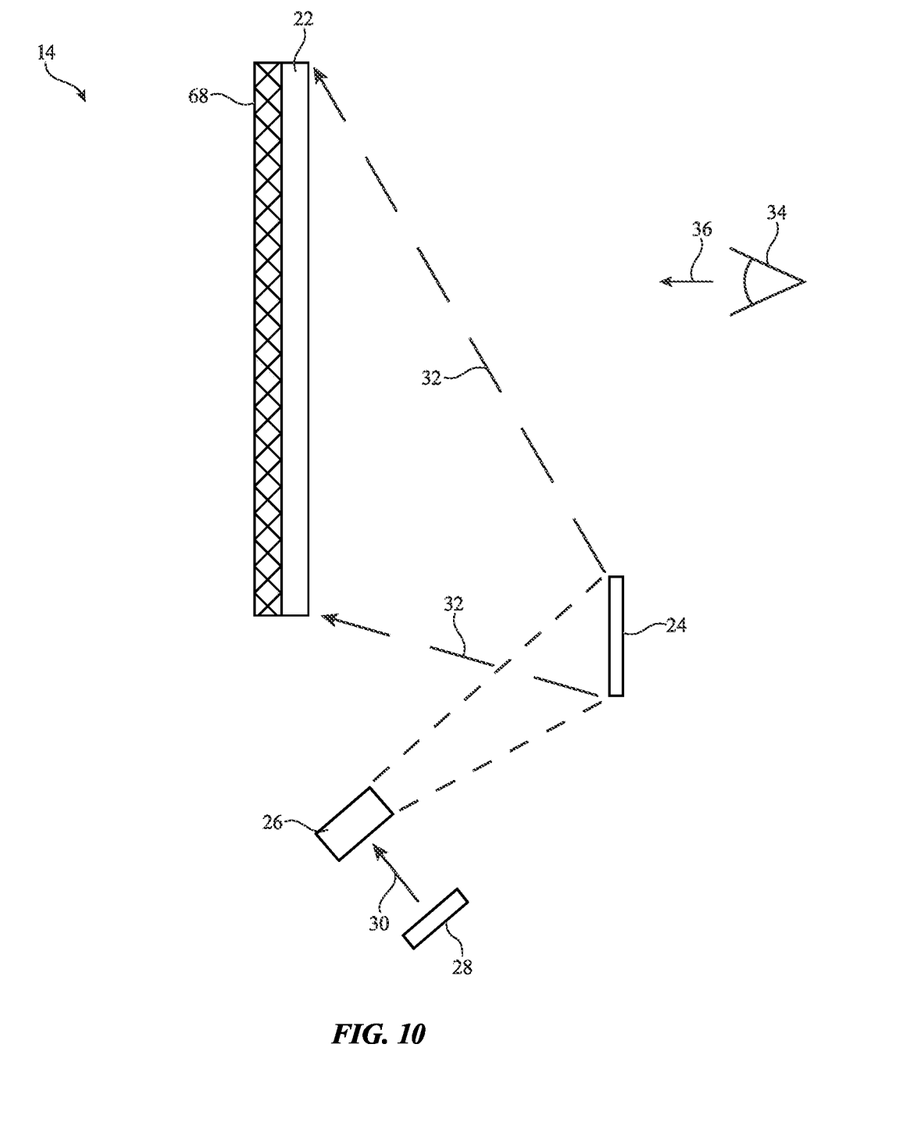
FIG. 10 is a side view of a projection display with an adjustable reflectivity layer in accordance with some embodiments.

FIG. 10 is a diagram of a front-projection display with a switchable mirror for additional improvements in contrast ratio. As shown in FIG. 10, display 14 includes an illumination engine 28 (which may optionally be pixelated), a spatial light modulator 26, a mirror 24, and an adjustable diffuser 22 (which may optionally be pixelated). Display 14 additionally includes a switchable mirror 68 on the rear-side of adjustable diffuser 22. Adjustable diffuser 22 is therefore interposed between viewer 34 and switchable mirror 68.

Switchable mirror 68 (sometimes referred to as adjustable reflectivity layer 68) may be switchable between a first state having a maximum reflectivity (and minimum transparency) and a second state having a minimum reflectivity (and maximum transparency). The switchable mirror may optionally be placed in another state with an intermediate reflectivity between the maximum reflectivity and the minimum reflectivity.

The switchable mirror may be formed from a cholesteric liquid crystal (CLC) device that is capable of rapidly switching between the first state and the second state. The minimum reflectivity of switchable mirror 68 may be less than 20%, less than 10%, less than 5%, less than 3%, less than 1%, etc. The maximum reflectivity of switchable mirror 68 may be greater than 20%, greater than 30%, greater than 40%, greater than 50%, greater than 60%, greater than 70%, greater than 80%, greater than 90%, greater than 95%, etc. The ratio of the maximum reflectivity to the minimum reflectivity of switchable mirror 68 may be greater than 2, greater than 3, greater than 5, greater than 10, greater than 20, greater than 40, greater than 60, greater than 75, greater than 90, etc. In some cases, the switchable mirror may be a bistable switchable mirror that is operable in either a first state with the maximum reflectivity or a second state with the minimum reflectivity. In some cases, the switchable mirror may be set to have an intermediate reflectivity between the minimum reflectivity and the maximum reflectivity if desired.

The minimum transparency of switchable mirror 68 may be less than 20%, less than 10%, less than 5%, less than 3%, less than 1%, etc. The maximum transparency of switchable mirror 68 may be greater than 20%, greater than 30%, greater than 40%, greater than 50%, greater than 60%, greater than 70%, greater than 80%, greater than 90%, greater than 95%, etc. The ratio of the maximum transparency to the minimum transparency of switchable mirror 68 may be greater than 2, greater than 3, greater than 5, greater than 10, greater than 20, greater than greater than 60, greater than 75, greater than 90, etc.

The minimum transparency of switchable mirror 68 may be less than 20%, less than 108, less than 5%, less than 3%, less than 18, etc. The maximum transparency of switchable mirror 68 may be greater than 208, greater than 30%, greater than 40%, greater than 50%, greater than 60%, greater than 70%, greater than 80%, greater than 90%, greater than 958, etc. The ratio of the maximum transparency to the minimum transparency of switchable mirror 68 may be greater than 2, greater than 3, greater than 5, greater than 10, greater than 20, greater than 40, greater than 60, greater than 75, greater than 90, etc.

The switchable mirror may be placed in a reflective mode (with maximum reflectivity) when the display is on such that the projected light is reflected towards viewer 34 to increase the perceived brightness of display 14 for viewer 34. The switchable mirror may be placed in a transparent mode (with minimum reflectivity) when the display is off to ensure the display has a high transparency in the off state.

Adjustable reflectivity layer 68 in FIG. 10 may optionally be pixelated if desired. Each individually addressable portion (pixel) in adjustable reflectivity layer 68 may have an individually controlled reflectivity.

In any of the displays herein (e.g., FIGS. 2 and 6-10), an anti-reflection coating may be incorporated on the front surface (e.g., the viewer-facing surface) and/or back surface (e.g., the non-viewer-facing surface) of the display. For example, an anti-reflection coating may be incorporated on the front and/or back surface of adjustable diffuser 22 in FIG. 2A, 2B, 6, or 7. An anti-reflection coating may be incorporated on the viewer-facing surface of adjustable diffuser 22 in FIGS. 8 and 10. An anti-reflection coating may be incorporated on the non-viewer-facing surface of adjustable opacity layer 66 in FIGS. 8 and 9. An anti-reflection coating may be incorporated on the viewer-facing surface of transparent display panel 14P in FIG. 9. An anti-reflection coating may be incorporated on the non-viewer-facing surface of adjustable reflectivity layer 68 in FIG. 10. An anti-reflection coating may be incorporated between components of the display (e.g., between adjustable diffuser 22 and adjustable opacity layer 66 in FIG. 8) if desired.

Figure 11:
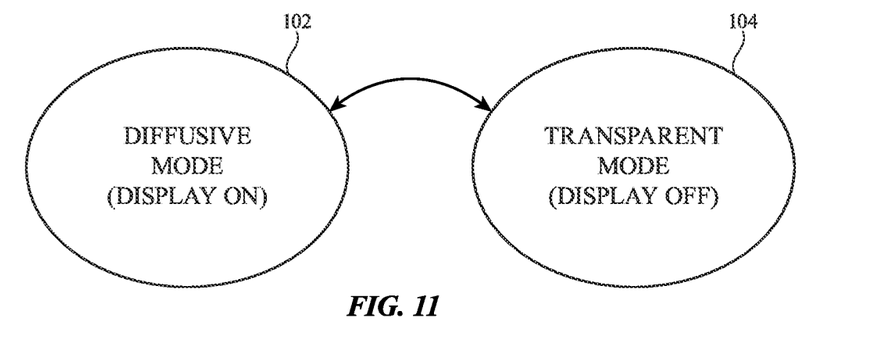
FIG. 11 is a state diagram showing operating modes for an illustrative adjustable diffuser in accordance with some embodiments.

FIG. 11 is a state diagram showing operating modes for the adjustable diffuser herein. As shown, the adjustable diffuser may be operable in a diffusive mode 102 and a transparent mode 104. In the diffusive mode, the adjustable diffuser may have a maximum diffusion level or an intermediate diffusion level that is higher than the minimum diffusion level. In the transparent mode, the adjustable diffuser may have a minimum diffusion level. The adjustable diffuser may be placed in the diffusive mode when the display is on to allow a viewer to see images projected onto the adjustable diffuser. The adjustable diffuser may be placed in the transparent mode when the display is off to cause the display to have a transparent appearance (and appear invisible) when the display is off. In embodiments where the adjustable diffuser is a pixelated adjustable diffuser, each pixel within the adjustable diffuser may be switched between diffusive mode 102 and transparent mode 104 individually.

Figure 12:
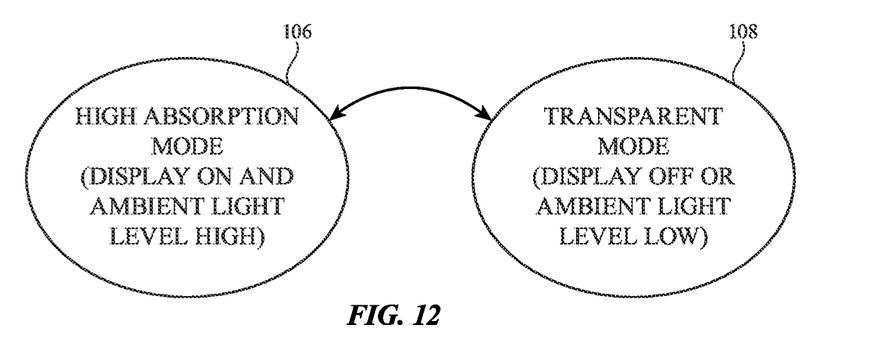
FIG. 12 is a state diagram showing operating modes for an illustrative adjustable opacity layer in accordance with some embodiments.

FIG. 12 is a state diagram showing operating modes for the adjustable opacity layer herein. As shown, the adjustable opacity layer may be operable in a high absorption mode 106 (sometimes referred to as high opacity mode) and a transparent mode 108 (sometimes referred to as low opacity mode 108). In the high opacity mode, the adjustable opacity layer may have a maximum opacity or an intermediate opacity that is higher than the minimum opacity. In the transparent mode, the adjustable opacity layer may have a minimum opacity. The adjustable opacity layer may be placed in the high absorption mode when the display is on and ambient light levels are high (e.g., a detected ambient light level is greater than a predetermined threshold). The adjustable opacity layer may be placed in the transparent mode when the display is off to cause the display to have a transparent appearance (and appear invisible) when the display is off. The adjustable opacity layer may also be placed in the transparent mode when the display is on and ambient light levels are low (e.g., a detected ambient light level is less than a predetermined threshold). If desired, the adjustable opacity layer may be a pixelated adjustable opacity layer where the mode (e.g., high absorption mode 106 or transparent mode 108) for each pixel is determined individually.

Figure 13:
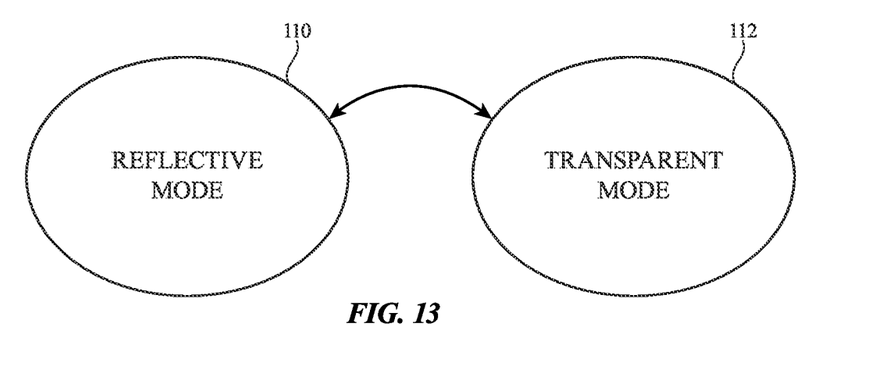
FIG. 13 is a state diagram showing operating modes for an illustrative adjustable reflectivity layer in accordance with some embodiments.

FIG. 13 is a state diagram showing operating modes for the adjustable reflectivity layer herein. As shown, the adjustable reflectivity layer may be operable in a reflective mode 110 (sometimes referred to as high reflectivity mode) and a transparent mode 112 (sometimes referred to as low reflectivity mode 112). In the high reflectivity mode, the adjustable reflectivity layer may have a maximum reflectivity or an intermediate reflectivity that is higher than the minimum reflectivity. In the transparent mode, the adjustable reflectivity layer may have a minimum reflectivity. The adjustable reflectivity layer may be placed in the reflective mode when the display is on to increase the contrast of the display. The adjustable reflectivity layer may be placed in the transparent mode when the display is off to cause the display to have a transparent appearance (and appear invisible) when the display is off. If desired, the adjustable reflectivity layer may be a pixelated adjustable reflectivity layer where the mode (e.g., high reflectivity mode 110 or transparent mode 112) for each pixel is determined individually.

Figure 14:
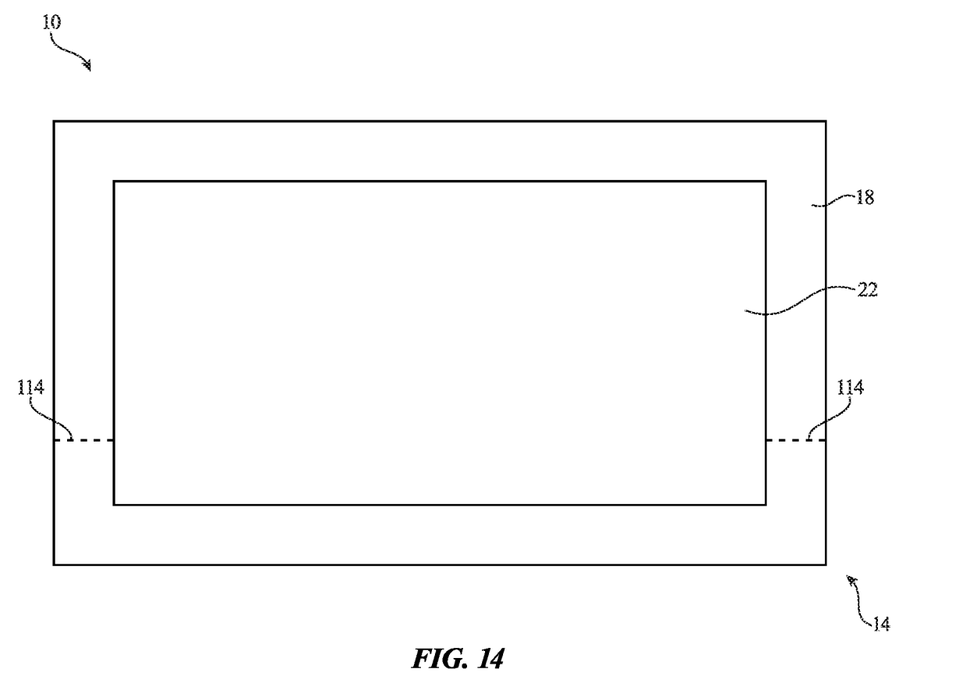
FIG. 14 is a view of an illustrative electronic device including a display that is transparent in the off state in accordance with some embodiments.

FIG. 14 is a top view of an illustrative electronic device 10 with a display having high off-state transparency. As shown in FIG. 14, adjustable diffuser 22 of display 14 may be coupled to housing 18. Housing 18 may be formed from plastic, metal, fiber-composite materials such as carbon-fiber materials, wood and other natural materials, glass, other materials, and/or combinations of two or more of these materials. Various components of display 14 (e.g., illumination engine 28, spatial light modulator 26, and mirror 24) may be coupled to housing 18 and obfuscated from view by housing 18. In other words, housing 18 prevents illumination engine 28, spatial light modulator 26, and mirror 24 from being visible during normal operation of electronic device 10. However, additional components in display 14 such as adjustable diffuser 22, adjustable opacity layer 66, and/or adjustable reflectivity layer 68 may extend outside of housing 18 such that the components are directly viewable by a viewer during normal operation of electronic device 10.

In some cases, housing 18 may extend around the entire periphery of adjustable diffuser 22 (and optionally adjustable opacity layer 66 and/or adjustable reflectivity layer 68). In these cases, adjustable diffuser 22 (and optionally adjustable opacity layer 66 and/or adjustable reflectivity layer 68) may be referred to as being formed in a central opening defined by the ring-shaped housing.

In other cases, housing 18 may extend only partially around the periphery of adjustable diffuser 22 (and optionally adjustable opacity layer 66 and/or adjustable reflectivity layer 68). For example, housing 18 may only be included below the dashed lines 114 in FIG. 14, with the remaining portion of housing 18 (above the dashed lines in FIG. 14) omitted. In this type of arrangement, adjustable diffuser 22 (and optionally adjustable opacity layer 66 and/or adjustable reflectivity layer 68) extends away from housing 18 and is not encircled by housing 18. In the example of FIG. 14, the portion of housing 18 is formed along a bottom edge of the adjustable diffuser, less than half of the left edge of the adjustable diffuser, less than half of the right edge of the adjustable diffuser, and none of the top edge of the adjustable diffuser. This example is merely illustrative. In general, housing 18 may be formed along any desired portion(s) of any desired edge(s) of the adjustable diffuser.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
    a housing; and
    a projection display that is configured to display images and that is coupled to the housing, wherein the projection display comprises:
        an adjustable diffuser operable in a first mode and a second mode in which diffusion is higher than the first mode;
        a spatial light modulator configured to project light for the images onto the adjustable diffuser while the adjustable diffuser is in the second mode, wherein the adjustable diffuser is configured to operate in the first mode when the projection display is off; and
        a mirror that reflects the light from the spatial light modulator onto the adjustable diffuser.

2. The electronic device defined in claim 1, wherein the adjustable diffuser has first and second opposing sides, wherein the first side is configured to be interposed between a viewer and the second side, and wherein the spatial light modulator projects the light onto the second side of the adjustable diffuser.

3. The electronic device defined in claim 1, wherein the adjustable diffuser comprises polymer dispersed liquid crystal (PDLC).

4. The electronic device defined in claim 3, wherein the polymer dispersed liquid crystal is interposed between first and second electrodes and wherein the adjustable diffuser comprises a voltage source that is configured to control the polymer dispersed liquid crystal using the first and second electrodes.

5. The electronic device defined in claim 1, wherein the adjustable diffuser comprises polymer stabilized cholesteric texture (PSCT) material.

6. The electronic device defined in claim 5, wherein the polymer stabilized cholesteric texture material is interposed between first and second electrodes, wherein the adjustable diffuser comprises a voltage source that is configured to control the polymer stabilized cholesteric texture material using the first and second electrodes, and wherein the voltage source is configured to apply no voltage to the first and second electrodes when the adjustable diffuser is in the first mode.

7. The electronic device defined in claim 5, wherein the polymer stabilized cholesteric texture material is interposed between first and second electrodes, wherein the adjustable diffuser comprises a voltage source that is configured to control the polymer stabilized cholesteric texture material using the first and second electrodes, and wherein the voltage source is configured to apply no voltage to the first and second electrodes when the adjustable diffuser is in the second mode.

8. The electronic device defined in claim 1, wherein the adjustable diffuser comprises a plurality of independently addressable portions that are each operable in the first mode and the second mode.

9. The electronic device defined in claim 1, wherein the projection display further comprises:
    a light source that comprises a plurality of pixels with independently controllable brightness, wherein the spatial light modulator is configured to receive the light from the light source.

10. The electronic device defined in claim 9, wherein the adjustable diffuser comprises a plurality of independently addressable portions that are each operable in the first mode and the second mode and wherein the number of independently addressable portions in the adjustable diffuser is less than the number of pixels in the light source.

11. The electronic device defined in claim 1, further comprising:
    an adjustable opacity layer that is operable in a third mode with a first opacity and a fourth mode with a second opacity that is greater than the first opacity.

12. The electronic device defined in claim 11, wherein the adjustable diffuser is configured to be interposed between the adjustable opacity layer and a viewer.

13. The electronic device defined in claim 11, further comprising:
    an ambient light sensor, wherein the adjustable opacity layer is configured to operate in a selected one of the third mode and the fourth mode based on information from the ambient light sensor.

14. The electronic device defined in claim 13, wherein the adjustable opacity layer is configured to operate in the fourth mode in response to an ambient light level detected by the ambient light sensor exceeding a threshold.

15. The electronic device defined in claim 1, further comprising:
    an adjustable reflectivity layer that is operable in a third mode with a first reflectivity and a fourth mode with a second reflectivity that is greater than the first reflectivity.

16. The electronic device defined in claim 15, wherein the adjustable diffuser is configured to be interposed between the adjustable reflectivity layer and a viewer.

17. An electronic device comprising:
   a housing; and
   a projection display that is configured to display images and that is coupled to the housing, wherein the projection display comprises:
      an adjustable diffuser operable in a first mode and a second mode in which diffusion is higher than the first mode, wherein the adjustable diffuser has first and second opposing sides and wherein the first side is configured to be interposed between a viewer and the second side; and
      a spatial light modulator configured to project light for the images onto the adjustable diffuser while the adjustable diffuser is in the second mode, wherein the adjustable diffuser is configured to operate in the first mode when the projection display is off and wherein the spatial light modulator projects the light onto the first side of the adjustable diffuser.

18. The electronic device defined in claim 17, wherein the projection display further comprises:
   a mirror that reflects the light from the spatial light modulator onto the adjustable diffuser.

19. An electronic device comprising:
   a housing;
   an adjustable diffuser that is coupled to the housing, wherein the adjustable diffuser has first and second opposing edges connected by third and fourth opposing edges, wherein the housing extends along all of the first edge, some but not all of the third edge, some but not all of the fourth edge, and none of the second edge, and wherein a portion of the adjustable diffuser extends outside of the housing; and
   a spatial light modulator that is coupled to the housing and that is configured to project light onto the adjustable diffuser, wherein the housing is configured to obfuscate the spatial light modulator from view.

20. The electronic device defined in claim 19, wherein the portion of the adjustable diffuser is visible during operation of the electronic device.

* * * * *